May 5, 1931.  L. THIRY  1,803,491
MANUFACTURE OF ELASTIC JOINTS AND SUPPORTS
Filed Feb. 15, 1929

LÉON THIRY
INVENTOR
BY
HIS ATTORNEY

Patented May 5, 1931

1,803,491

UNITED STATES PATENT OFFICE

LEON THIRY, OF HUY, BELGIUM

MANUFACTURE OF ELASTIC JOINTS AND SUPPORTS

Application filed February 15, 1929, Serial No. 340,309, and in France September 19, 1928.

The present invention relates to the manufacture of elastic joints or supports of the type comprising two concentric metallic sleeves or sockets, or equivalent devices, and an insert of elastic material, such as India rubber or the like, subjected to an initial deformation.

In the manufacture of elastic supports or joints, in which the rubber insert is considerably elongated, that is, in which the radial dimensions are much reduced with reference to the original state of the elastic substance, a great difficulty arises during the operation of introduction of the rubber insert, due to the strong adhesion between the elastic substance and the metallic walls containing the same.

It will be understood that, when the elastic substance is drawn out, it strongly adheres to the surfaces, and is prevented from sliding along the punch, the matrix and the metallic sleeves or sockets forming the internal and external parts of the completed elastic support or joint.

This adhesion occasions a gripping action by which parts may be torn off, or it causes the material to be rolled or upturned, or like effects may be produced, whereby the finished product will be defective.

The use of a lubricant will obviate such defects, provided the said lubricant (such as water, soap water, petroleum jelly or the like) is not expelled before the operation is completed. For this purpose, it has been already proposed to manufacture the elastic joints or supports by imparting a high speed to the parts having a relative movement during the operation of introduction of the rubber insert.

The invention has for its object a new process of manufacture of elastic joints of the kind referred to in which one of two rigid members is introduced at high speed, into an elastic insert carried by the other member and, by means of which all such defects are eliminated, and which essentially consists in forming at the ends of the ring of elastic material, when in the free state, suitable rounded parts on the edges of said ring which first engage the metallic parts (sleeves and tools).

The invention further relates to a tool outfit, consisting of a matrix and a punch, provided with means whereby lubricant under pressure may be supplied between the elastic ring and the metallic sleeves or sockets, and the tools during the manufacture of the elastic support or joint.

Further characteristics of the invention will be specified in the following description, with reference to the accompanying drawing which is given solely by way of example. In this drawing.

Figure 1:
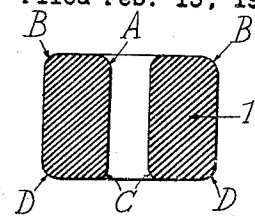
Fig. 1 is a sectional view of the ring of elastic material, in the free state.
Figure 2:
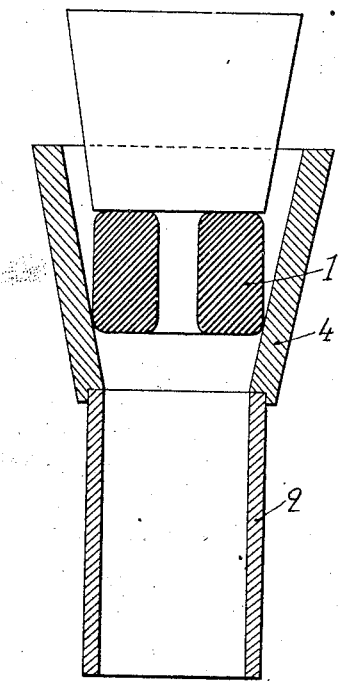
Figs. 2 and 3 are diagrammatic sectional views showing the two steps in the manufacture of an elastic joint or support.
Figure 3:
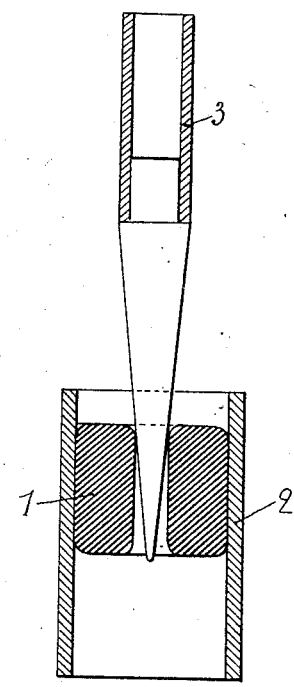

In the form of construction shown in Fig. 1, the ring of elastic material 1, in the free state, is formed at each end, and on the edges which are adapted to engage metallic surfaces, with suitable rounded parts A—A, B—B, C—C, D—D, whose section is an arc of a circle or equivalent shapes.

Due to the provision of such rounded edges, during the insertion of the ring 1 into the funnel 4 and into the external sleeve or socket 2, and during the insertion of the punch and of the internal sleeve 3 into the ring 1, the lubricant which coats the surfaces of said ring and sleeves at the beginning of the operation, will not be expelled but will remain interposed between the surfaces in contact, and it thus prevents the ring from adhering to the metallic surfaces. This action is similar to the so-called "Mitchel effect", which has already been applied with success for the lubrication of bearings. Obviously, such rounded parts may be provided upon rings of elastic material irrespectively of the rate at which the said rings are inserted in place.

To more effectively prevent the gripping of the ring of elastic material upon the metallic surfaces, lubricant under pressure may be supplied by any suitable means between the contact surfaces whose gripping is to be prevented. By way of example, use may be made of a funnel tool 4 (Fig. 4), whose inner surface has a stepped outline, as shown, the recesses 8 facing to the front in the direction of the movement of introduction of the rubber insert (arrow $f$), ducts or ports 6 extending through the funnel wall and opening into said recesses. Lubricant under pressure may be forced through said ducts, for example by means of small tubes connected therewith or by forcing lubricant into a jacket surrounding the funnel tool (not shown). It is supposed in the drawing that the funnel tool is made of interfitting conical sections assembled by friction.

For the same purpose, the punch 5 (Fig. 5) is provided with an axial bore 7 and radial ducts 7a for the supply of lubricant under pressure. As in the preceding case, said ducts preferably open into peripheral grooves 9, facing to the rear in the direction of motion of the punch (arrow $f$).

The pressure of the lubricant forced through the ducts 6, 7, 7a should preferably exceed the pressure exercised by the deformed elastic material upon the metallic surfaces during the insertion, in order that the elastic material should not be forced through said ducts. This drawback is also obviated by the disposition above-indicated of the grooves 8, 9 relatively to the direction of the movement.

Figure 4:
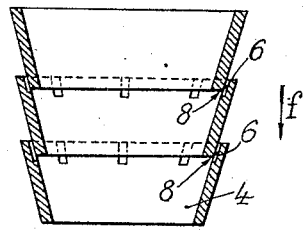
Fig. 4 is a sectional view of a funnel tool according to the invention, for use in the first operation.
Figure 5:
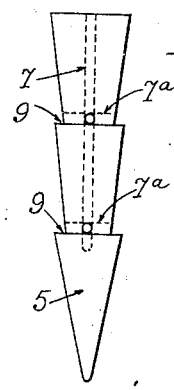
Fig. 5 is an elevational view of a punch employed for the second operation.

Obviously, the rounded parts C—C and B—B may be eliminated without departing from the principle of the invention, inasmuch as they are only provided for the sake of symmetry and also to prevent the wrong end of the ring from being inserted due to negligence. Furthermore, the invention is not limited to the construction of the funnel tool and punch which is shown in Figures 4 and 5, this construction being described and represented solely by way of example.

Having now described my invention what I claim as new and desire to secure by Letters Patent is:

1. A punch for the manufacture of elastic joints and supports of the kind referred to, having outwardly opening ducts adapted to be supplied with lubricant under pressure.

2. A punch as claimed in claim 1, wherein said ducts open into grooves provided on the periphery of said punch and facing to the large base of said punch.

3. In a process of manufacturing elastic joints and supports of the kind referred to, the feature of supplying lubricant between the surfaces of the elastic insert and the metallic surfaces engaged thereby during the insertion, under a pressure at least equal to the pressure exercised by said elastic insert between said surfaces.

4. The process of manufacturing flexible joints, comprising at least two rigid members and a hollow insert of elastic material, which consists in rounding off the edges of said elastic material, and thereafter introducing said insert at a high speed between said members.

5. A process as claimed in claim 4, which further comprises dipping said members and said insert into a lubricant prior to the introduction step.

6. The process of manufacturing flexible joints, comprising at least two rigid members, one thereof being an outer shell and the other an internal sleeve, and an annular insert of elastic material having its transverse cross sectional dimension greater than that of the outer shell, which consists in rounding off the inner and outer edges of the insert, and thereafter introducing the insert at a high speed between said members.

7. A process as claimed in claim 6, which further comprises dipping said insert into a lubricant prior to the introduction steps.

In testimony whereof I affix my signature.

LEON THIRY.